(12) United States Patent
Morris et al.

(10) Patent No.: US 9,662,957 B2
(45) Date of Patent: May 30, 2017

(54) VEHICLE HVAC SYSTEM WITH LOWER MOUNTED BLOWER UNIT

(71) Applicant: DENSO International America, Inc., Southfield, MI (US)

(72) Inventors: William Morris, Beverly Hills, MI (US); Brian Belanger, Farmington Hills, MI (US)

(73) Assignee: Denso International America, Inc., Southfield, MI (US)

( * ) Notice: Subject to any disclaimer, the term of this patent is extended or adjusted under 35 U.S.C. 154(b) by 352 days.

(21) Appl. No.: 14/221,677

(22) Filed: Mar. 21, 2014

(65) Prior Publication Data

US 2014/0283543 A1     Sep. 25, 2014

Related U.S. Application Data

(60) Provisional application No. 61/804,228, filed on Mar. 22, 2013.

(51) Int. Cl.
*B60H 1/00*     (2006.01)

(52) U.S. Cl.
CPC ............ *B60H 1/00028* (2013.01); *B60H 2001/00107* (2013.01)

(58) Field of Classification Search
CPC ...... B60H 1/00028; B60H 2001/00242; B60H 1/00007; B60H 1/3202; B60H 1/3227; B60H 1/00042; B60H 1/00321

USPC .......... 454/156, 159, 139, 161; 62/239, 244
See application file for complete search history.

(56) References Cited

U.S. PATENT DOCUMENTS 6,958,009 B2 * 10/2005 Shindou ............ B60H 1/00028
                                                      454/121
2009/0124187 A1 * 5/2009 Sievers ............. B60H 1/00007
                                                       454/75

FOREIGN PATENT DOCUMENTS

KR     2005-0032684      4/2005

* cited by examiner

*Primary Examiner* — Steven B McAllister
*Assistant Examiner* — Ko-Wei Lin
(74) *Attorney, Agent, or Firm* — Harness, Dickey & Pierce, P.L.C.

(57) ABSTRACT

A heating, ventilation, and air conditioning (HVAC) system for a vehicle may include a blower unit, an evaporator unit, and a conditioning unit. The blower unit includes a fan that draws in air into the HVAC system. The evaporator unit is downstream from the blower unit, and the air drawn in by the fan flows through an evaporator of the evaporator unit. The conditioning unit is downstream from the evaporator unit. The blower unit is disposed below the conditioning unit.

6 Claims, 4 Drawing Sheets

VEHICLE HVAC SYSTEM WITH LOWER MOUNTED BLOWER UNIT

CROSS-REFERENCE TO RELATED APPLICATIONS

This application claims the benefit of U.S. Provisional Application No. 61/804,228, filed on Mar. 22, 2013. The entire disclosure of the above application is incorporated herein by reference.

FIELD

The present disclosure relates to vehicle heating, ventilation and air conditioning (HVAC) system. More particularly, the present disclosure relates to a low mounted blower unit for the HVAC system.

BACKGROUND

This section provides background information related to the present disclosure which is not necessarily prior art. Vehicles are known to incorporate a heating, ventilation and air conditioning (HVAC) system to improve the comfort of the people within the passenger compartment of the vehicle. The HVAC system heats and cools air blown through the HVAC system using a heating heat exchanger and/or a cooling heat exchanger. The heating heat exchanger typically utilizes the engine coolant as a source of heat for heating the air. The cooling heat exchanger is typically an evaporator which is part of an air conditioning system in the vehicle.

The air blown through the HVAC system is drawn in via a blower fan which is typically positioned with a HVAC housing. The blower fan draws in air from outside the vehicle. The air then flows through the HVAC system where it is conditioned (heated/cooled), and then directed into the passenger compartment of the vehicle through one or more outlet vents.

One disadvantage of a typical HVAC system is the packaging size required for the HVAC housing. More particularly, the HVAC system is typically positioned behind a dashboard of the vehicle to access the outlet vents within the passenger compartment. Such a location is typically congested with various other devices and systems, and leaves little space for the HVAC system.

SUMMARY

This section provides a general summary of the disclosure, and is not a comprehensive disclosure of its full scope or all of its features.

The present disclosure provides for a heating, ventilation and air conditioning (HVAC) system for a vehicle. The HVAC system includes a blower unit, an evaporator unit, and a conditioning unit. The blower unit draws in fresh air into the HVAC system. The evaporator unit is disposed downstream from the blower unit and receives the air drawn in by the blower unit. The conditioning unit is disposed downstream from the evaporator unit, and conditions the air to a desired temperature before providing the air to a passenger compartment of the vehicle. The blower unit is positioned below or at a level lower than the conditioning unit along a vertical axis of the vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
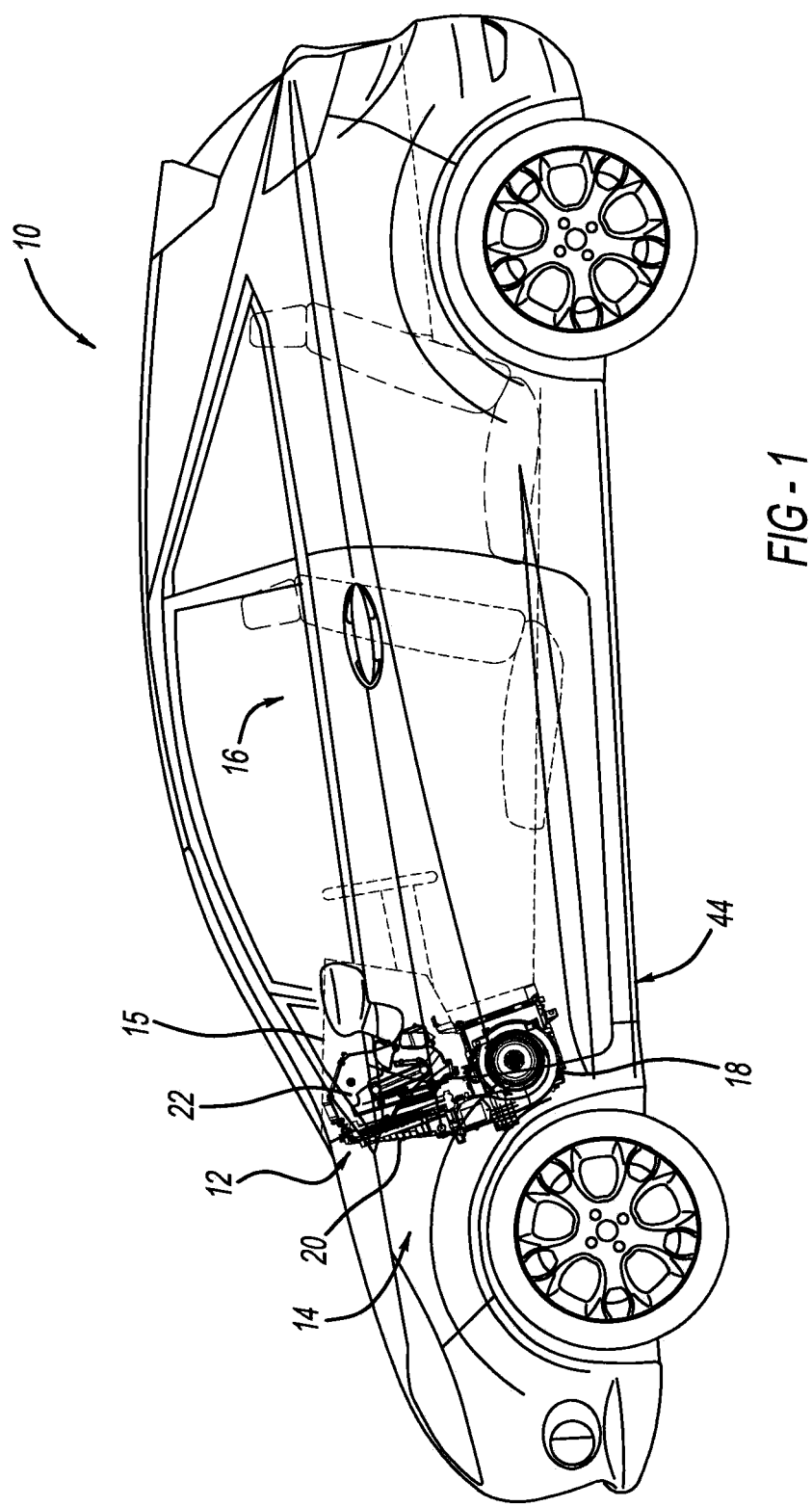
FIG. 1 is side view of a vehicle having a heating, venting, and air conditioning (HVAC) system in accordance with the present disclosure.

The present disclosure will now be described more fully with reference to the accompanying drawings. With reference to FIG. 1, a vehicle 10 having a heating, ventilation, and air conditioning (HVAC) system 12 is presented. The HVAC system 12 is disposed within an engine compartment 14 of the vehicle 10 and is positioned behind a dashboard 15 of the vehicle 10. The HVAC system 12 heats and/or cools air within a passenger compartment 16 of the vehicle 10 as is known in the art. While the present disclosure discusses primary components of the HVAC system 12, it is understood that other components may be needed for the overall operation of the HVAC system 12.

Figure 2:
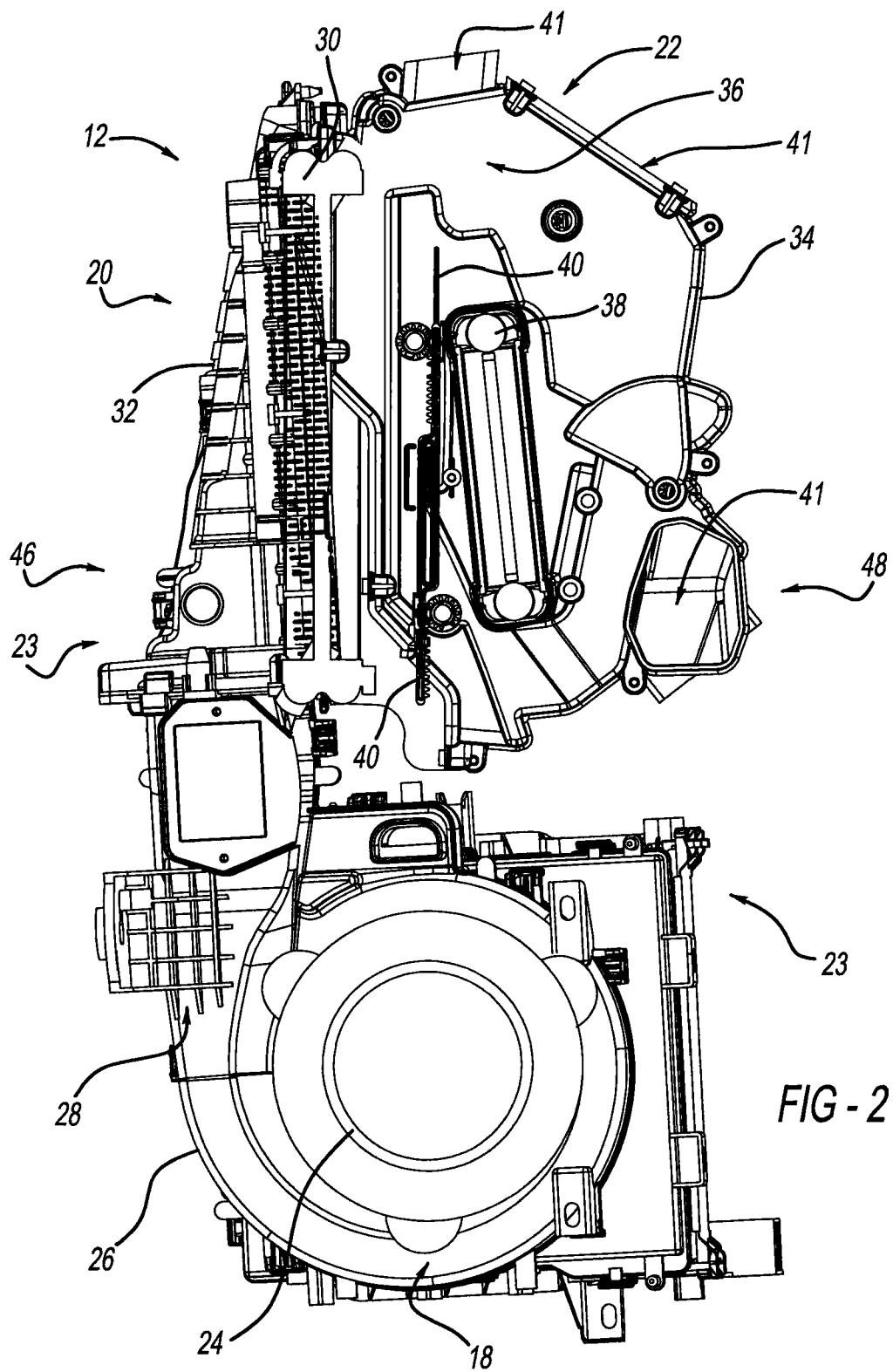
FIG. 2 is a cross-sectional view of the HVAC system which includes a blower unit, an evaporator unit, and a conditioning unit.
Figure 3:
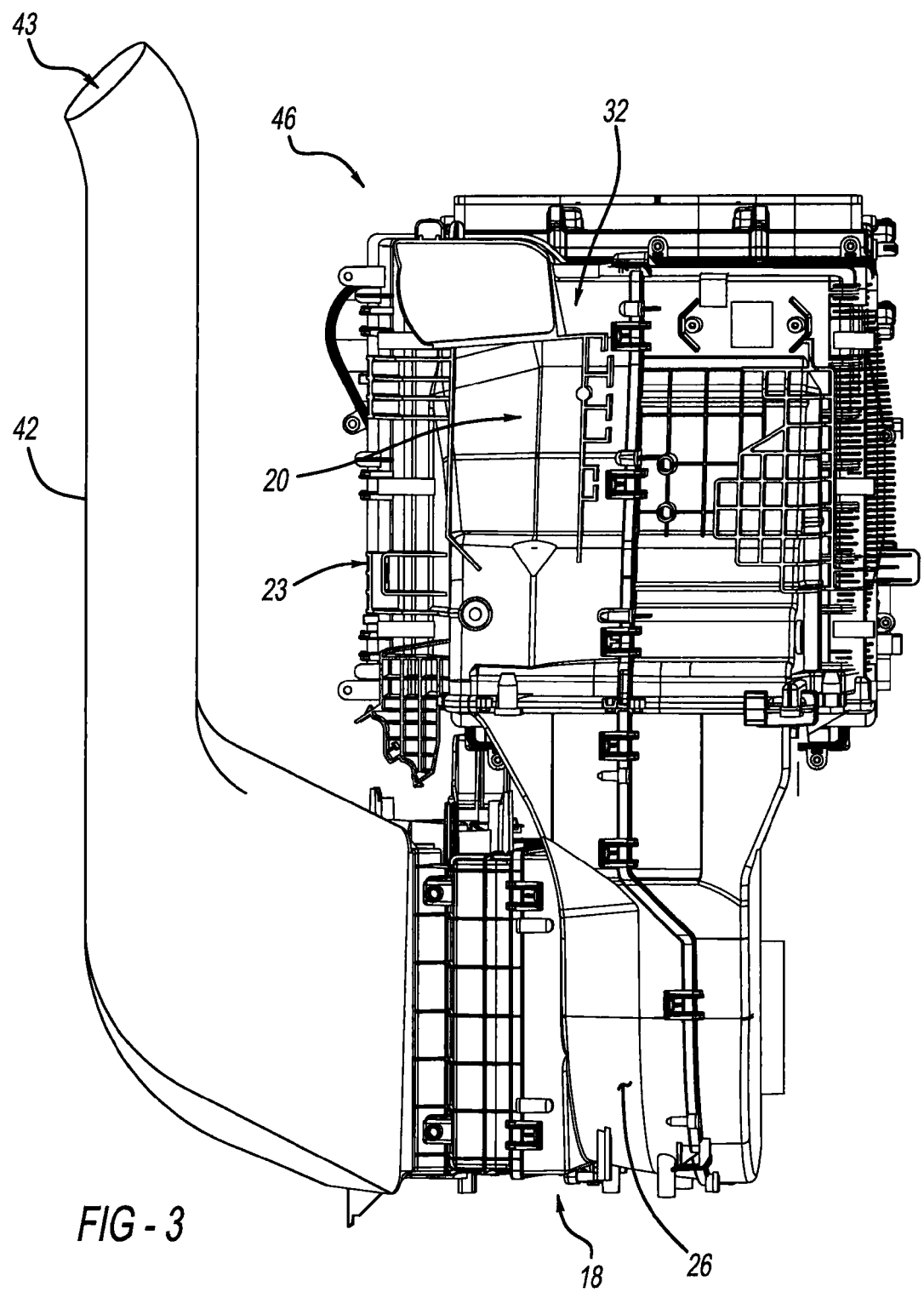
FIG. 3 is a front view of the HVAC system as viewed from an engine compartment of the vehicle.
Figure 4:
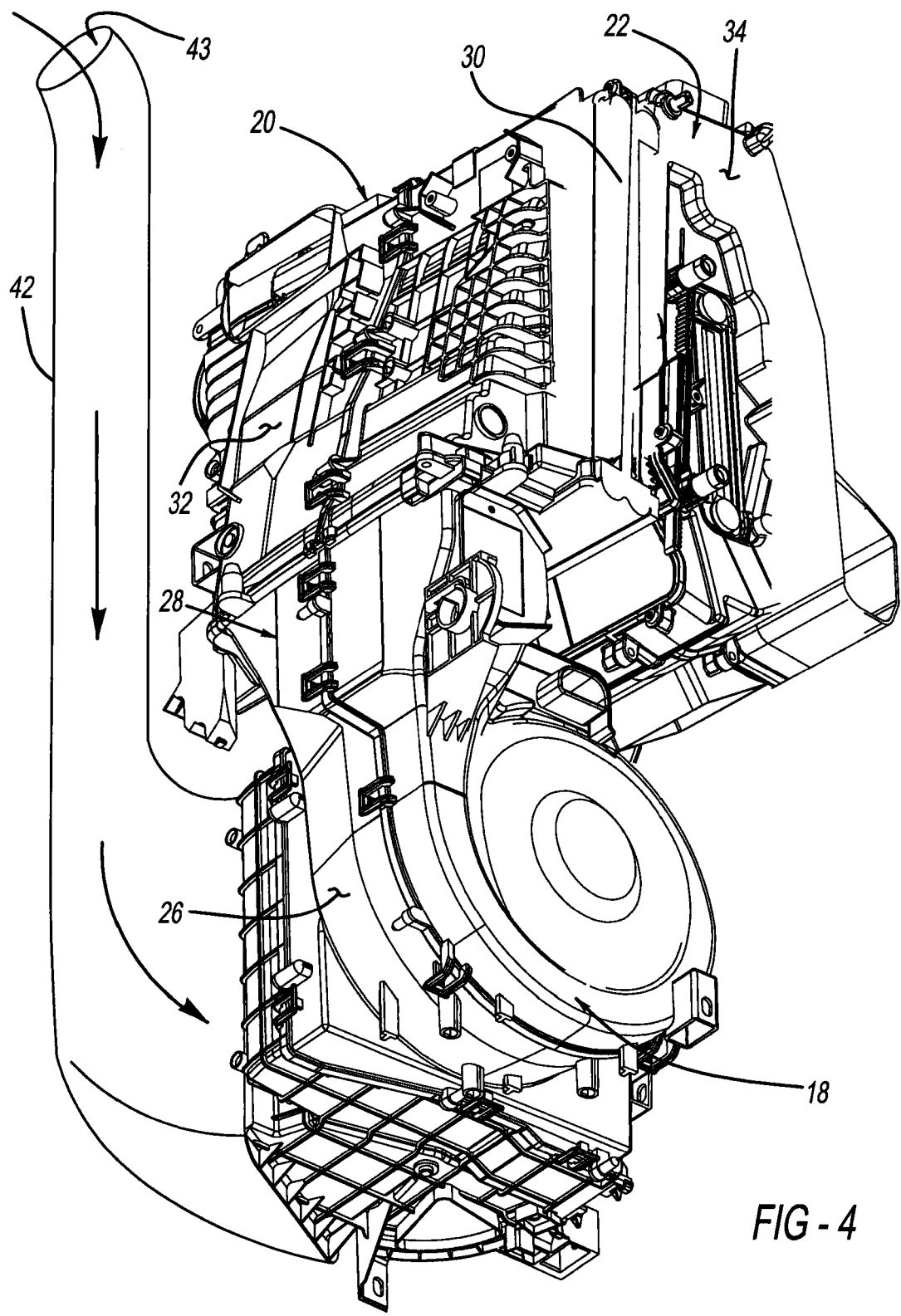
FIG. 4 is a side view of the HVAC system.

With reference to FIGS. 2-4 an example of the HVAC system 12 is presented. The HVAC system 12 includes a blower unit 18, an evaporator unit 20, a conditioning unit 22, and a housing 23. The blower unit 18 includes a fan 24 which is housed in a fan case 26 of the housing 23. The fan 24 draws in air into the HVAC system 12. The air drawn in by the fan 24 flows through an expansion region 28. The expansion region 28 balances the flow of air to a laminar smooth flow before the air enters an evaporator core 30.

The evaporator unit 20 includes the evaporator core 30 which is housed in an evaporator case 32 of the housing 23. The evaporator case 32 is part of the housing 23. The evaporator unit 20 is positioned downstream from the blower unit 18. The expansion region 28 may be defined by the fan case 26 and/or the evaporator case 32 of the housing 23. The air drawn in by the fan 24 and balanced in the expansion region 28 flows through the evaporator core 30. The evaporator core 30 may be a heat exchanger that cools the air flowing through the evaporator core 30 as is known in the art. The evaporator core 30 may be disposed at a position where the evaporator unit 20 couples with the conditioning unit 22.

The conditioning unit 22 is provided in a conditioning case 34 of the housing 23. The conditioning case 34 may also be known as a heater case. The conditioning case 34 is part of the housing 23. The conditioning case 34 defines an air passage 36 and may house a heater core 38. The heater core 38 is positioned downstream from the evaporator core 30. The amount of air entering the heater core 38 may be controlled via one or more doors 40. The heater core 38 heats the air flowing through the heater core 38. The air flowing from the evaporator core 30 and/or the heater core 38 flows through the air passage 36 where it is conditioned to a desired temperature before entering the passenger compartment 16 via one or more outlets 41.

In the example embodiment, the housing 23 of the HVAC system 12 includes the fan case 26, the evaporator case 32, and the conditioning case 34. Each of the cases 26, 32, 34 may be a separate component which are coupled together to form the housing 23. Alternatively the housing 23, may be made from one or more pieces where sections of the housing 23 can be designated as the cases 26, 32, 34.

To ensure proper flow of fresh air to the HVAC system 12, the HVAC system 12 further includes a flue 42 (FIGS. 3 and 4) which couples the blower unit 18 to an air inlet (not shown). The flue 42 may be an air duct that defines a passage 43 through which the air may travel. More particularly, when the blower unit 18 is in operation, air from outside of the vehicle 10 travels through the flue 42 (as indicated by the arrows in FIG. 4). The air then flows through the expansion region 28, the evaporator core 30, and the conditioning unit 22 where it is conditioned before entering the passenger compartment 16. The flue 42 may include a drain (not shown) that removes water from the air being drawn in. The drain may transfer the water to a floorpan 44 of the vehicle (FIG. 1). As known in the art, the HVAC system 12 includes a door for controlling the amount of fresh air entering the system 12. While the door can be placed within the housing 23, the door may also be placed within the flue 42. For example, the door may be positioned at a portion of the flue closest to the air inlet or even in the middle of the flue 42. The flue 42 may be made of metal or plastic.

In the example embodiment, the flue 42 is shown as extending along a side of the HVAC system 12. It is readily understood that the flue 42 may be configured in various suitable ways and is not limited to the configuration shown in the figures. For example, the flue 42 may extend to an air inlet that is disposed substantially at the same level as the blower unit 18, which may result in a smaller flue than the one shown in the figures.

The HVAC system 12 is coupled to a cross beam (not shown) of the vehicle 10 via the housing 23 or, more specifically, the conditioning unit 22. The HVAC system 12 may substantially extend vertically between the dashboard 15 and the floorpan 44. The HVAC system 12 is configured within the engine compartment 14, such that the blower unit 18 is adjacent to the floorpan 44 of the vehicle 10 and below the evaporator unit 20, the conditioning unit 22, and the dashboard 15. The outlets 41 of the conditioning unit 22 are coupled to vents within the passenger compartment 16. The evaporator unit 20 and the blower unit 18 may form a front side 46 of the HVAC system 12 (FIG. 2). Specifically, when viewing the HVAC system 12 from the engine compartment 14, as shown in FIG. 3, the evaporator unit 20 and the blower unit 18 face the front of the vehicle 10. Furthermore when viewing the HVAC system 12 from the passenger compartment 16, the blower unit 18 and the conditioning unit 22 substantially form a back side 48 of the HVAC system 12 (FIG. 2).

The blower unit 18 is disposed at a position of the HVAC system 12 which is lower than the conditioning unit 22. Specifically, as shown in FIGS. 1-4, the blower unit 18 is disposed below the evaporator unit 20 and the conditioning unit 22. The fan 24 of the blower unit 18 may be positioned under/below the evaporator core 30. By having lower mounted blower unit 18, the HVAC system 12 is able to utilize dead space typically available near the floorpan 44 of the vehicle 10. Such configuration allows the air to flow smoothly between the blower unit 18 and the conditioning unit 22. Specifically, the blower unit 18 is no longer restricted to a tight packaging area provided next to the conditioning unit 22. The tight packaging area typically resulted in a compact expansion region which can cause a high pressure build-up of air within the HVAC system 12. In the configuration of the present disclosure, the HVAC system 12 has a substantially linear expansion region 28 for balancing the air drawn in. Accordingly, the performance of the HVAC system 12 with the low mounted blower unit 18 is improved over an HVAC system with a blower unit disposed substantially parallel to a conditioning unit.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

An example embodiment is provided so that this disclosure will be thorough, and will fully convey the scope to those who are skilled in the art. Numerous specific details are set forth such as examples of specific components and devices to provide a thorough understanding of embodiments of the present disclosure. It will be apparent to those skilled in the art that specific details need not be employed, that example embodiments may be embodied in many different forms and that neither should be construed to limit the scope of the disclosure. Well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, and/or components, but do not preclude the presence or addition of one or more other features, elements, components, and/or groups thereof.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

What is claimed is:

1. A heating, ventilation, and air conditioning system for a vehicle comprising:
    a blower unit including a fan, wherein the fan draws in air;
    an evaporator unit including an evaporator, wherein the evaporator unit is downstream from the blower unit in an air flow direction, and the air drawn in by the fan flows through the evaporator; and a conditioning unit defining an air passage, wherein the conditioning unit is downstream from the evaporator unit in the air flow direction and conditions the air flowing in the air passage, and the blower unit is disposed at a position lower than the conditioning unit along a vertical axis of the vehicle;

wherein:

the conditioning unit includes a heat exchanger;

the blower unit and the evaporator unit define an expansion region that substantially extends from the fan towards the evaporator along the vertical axis of the vehicle;

the evaporator and the heat exchanger are arranged to be substantially parallel to each other along the vertical axis of the vehicle and to be spaced away from each other along a first direction perpendicular to the vertical axis; and the evaporator and the heat exchanger overlap the fan in a second direction parallel to the vertical axis when viewed from a side of the vehicle such that the evaporator and the heat exchanger are confined to an area having a width less than a width of the blower unit, wherein the area is defined by two linear lines extending parallel to the vertical axis and the second direction, the two linear lines are adjacent to opposite sides of the blower unit.

2. The heating, ventilation, and air conditioning system of claim 1 further comprising:

a flue, wherein the blower unit is coupled to the flue and draws in air from outside of the vehicle via the flue.

3. The heating, ventilation, and air conditioning system of claim 1 further comprising:

a housing for housing the blower unit, the evaporator unit, and the conditioning unit, wherein a portion of the housing in which the conditioning unit is disposed is above a portion of the housing in which the blower unit is disposed.

4. A heating, ventilation, and air conditioning system for a vehicle comprising:

a flue defining a passage;

a blower unit including a fan, wherein the blower unit is coupled to the flue, and the fan draws in air from outside the vehicle via the flue;

an evaporator unit including an evaporator, wherein the evaporator unit is downstream from the blower unit in an air flow direction, and the air drawn in by the fan flows through the evaporator; and a conditioning unit defining an air passage, wherein the conditioning unit is downstream from the evaporator unit in the air flow direction and conditions the air flowing in the air passage from the evaporator, the conditioning unit is substantially adjacent to a dashboard of the vehicle, and the blower unit is below the conditioning unit along a vertical axis of the vehicle;

wherein:

the conditioning unit includes a heat exchanger;

the blower unit and the evaporator unit define an expansion region that substantially extends from the fan towards the evaporator along the vertical axis of the vehicle;

the evaporator and the heat exchanger are arranged to be substantially parallel to each other along the vertical axis of the vehicle and to be spaced away from each other along a first direction perpendicular to the vertical axis; and the evaporator and the heat exchanger overlap the fan in a second direction parallel to the vertical axis when viewed from a side of the vehicle such that the evaporator and the heat exchanger are confined to an area having a width less than a width of the blower unit, wherein the area is defined by two linear lines extending parallel to the vertical axis and the second direction, the two linear lines are adjacent to opposite sides of the blower unit.

5. The heating, ventilation, and air conditioning system of claim 4 further comprising:

a housing for housing the blower unit, the evaporator unit, and the conditioning unit, wherein a portion of the housing in which the conditioning unit is disposed is above a portion of the housing in which the blower unit is disposed.

6. The heating, ventilation, and air conditioning system of claim 4 wherein the flue includes a door disposed along the passage to control the amount of air being drawn in.

\* \* \* \* \*